United States Patent [19]
McDade et al.

[11] Patent Number: 5,889,515
[45] Date of Patent: Mar. 30, 1999

[54] RENDERING AN AUDIO-VISUAL STREAM SYNCHRONIZED BY A SOFTWARE CLOCK IN A PERSONAL COMPUTER

[75] Inventors: Darryn D. McDade, Santa Clara; Jefferson E. Owen, Fremont, both of Calif.

[73] Assignee: STMicroelectronics, Inc., Carrollton, Tex.

[21] Appl. No.: 762,616

[22] Filed: Dec. 9, 1996

[51] Int. Cl.$^6$ .............................. G06F 17/00; G06F 1/12
[52] U.S. Cl. ........................ 345/302; 395/551; 395/556
[58] Field of Search ................................. 395/551, 556, 395/878–881; 345/302

[56] References Cited

U.S. PATENT DOCUMENTS

| 4,575,848 | 3/1986 | Moore et al. | 395/185.08 |
|---|---|---|---|
| 5,553,222 | 9/1996 | Milne et al. | 345/302 |
| 5,596,696 | 1/1997 | Tindell et al. | 345/302 |

OTHER PUBLICATIONS

Jack, Keith, *Video Demystified*: A Handbook for the Digital Engineer, 2d ed., Hightext Publications, San Diego, 1996, Chaps. 10 and 11, pp. 426–600.

*Primary Examiner*—Thomas M. Heckler
*Attorney, Agent, or Firm*—David V. Carlson; Theodore E. Galanthay; Lisa K. Jorgenson

[57] ABSTRACT

A DVD CD-ROM player integrated with a personal computer is provided. When integrating a DVD CD-ROM with a personal computer, there are various problems that must be overcome. For example, the stream from the DVD CD-ROM utilizes a 27 MHz clock. However, a personal computer typically does not have a 27 MHz clock, but instead has a system clock, that runs at the frequency of the processor. Therefore, in order to play a DVD-based audio-visual work in a personal computer, a clock running at 27 MHz is needed. As such, a software clock running at 27 MHz is provided which facilitates the integration of a DVD CD-ROM into a personal computer. By using a software clock, synchronization of the audio-visual stream is facilitated and both cost and development time are reduced.

21 Claims, 2 Drawing Sheets

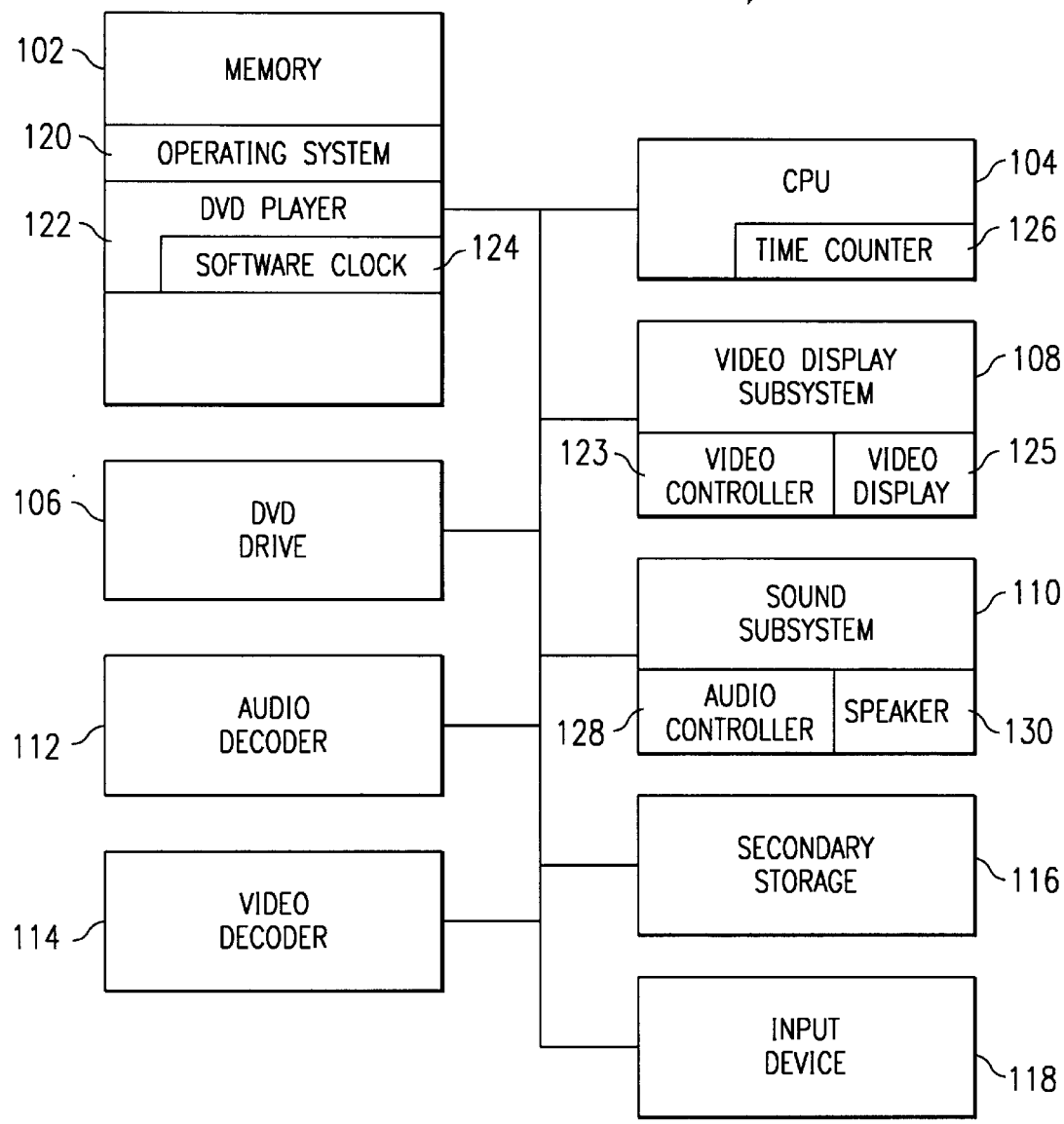
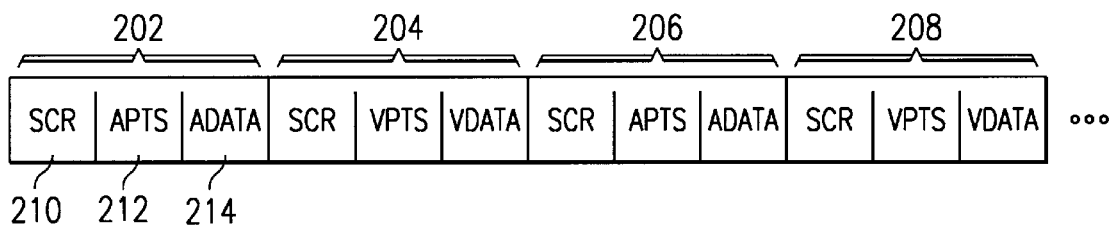

RENDERING AN AUDIO-VISUAL STREAM SYNCHRONIZED BY A SOFTWARE CLOCK IN A PERSONAL COMPUTER

TECHNICAL FIELD

The present invention relates generally to data processing systems and, more particularly, to rendering an audio-visual stream in a personal computer using a software clock.

BACKGROUND OF THE INVENTION

Digital video disc (DVD) devices store audio-visual data in a highly compressed form and play the audio-visual data to a user. These devices have a read only memory (ROM). The DVD CD-ROM disc is a super-density disc that can hold up to 18 gigabytes of audio, video and other types of data (e.g., menus, sub-pictures, graphics, etc.). As part of the audio-visual data, the DVD devices store video images on the disc so that the images may be later recalled and displayed on a video display. DVD CD-ROM players retrieve and display video images that have been compressed under known video compression techniques like the International Standard Organization's (ISO) Moving Picture Expert Group (MPEG) techniques MPEG 1 and MPEG 2.

MPEG 1 is an ISO standard defined in ISO/IEC 11172 that sets forth a standard format for storing and distributing audio and motion video. Some of the features of MPEG 1 include random access, fast forward, and reverse playback. Consequently, MPEG 1 has been used as the basis for video CDs and many video games. The goal of MPEG 1 is playback of digital audio and video using a standard compact disk with a bit rate of 1.416 Mbps, where 1.15 Mbps of this bit rate is designated for video.

MPEG 2 extends MPEG 1 to cover a wider range of applications. MPEG 2 is an ISO standard as defined by ISO/IEC 13818. The primary application originally targeted by MPEG 2 was all-digital transmission of broadcast-quality video at bit rates of 4–9 Mbps. However, MPEG 2 has become useful for many other applications, such as high definition television, and MPEG 2 now supports bit rates of 1.5–60 Mbps.

In addition to playing video images, DVD devices can also read and play compressed audio sequences using known audio decompression techniques (e.g., Dolby AC3, MPEG 1 or MPEG 2). As such, these systems are especially well-suited for playing audio-visual works, such as movies.

When playing an audio-visual work like a movie, the DVD device reads an audio-visual stream from the DVD CD-ROM and displays the video portion of the stream on the video display and plays the audio portion of the stream on a speaker. To facilitate the playing of the stream, the stream is stored on the CD-ROM using time stamps from a 27 MHz clock to indicate when a particular portion of the stream is to be played. These time stamps from the 27 MHz clock are also used to synchronize the audio and video portion of the stream at playtime. Otherwise, if the audio and video portion fell out of synchronization, the quality of the performance of the audio-visual work would greatly suffer (the viewer would notice a loss of lip synchronization). As a result of the time stamps of the audio-visual stream being generated using a 27 MHz clock, a clock running at 27 MHz is needed at playtime by the DVD device to ensure both that portions of the steam are played at the appropriate time and that the audio portion and the video portion of the stream are synchronized. As such, DVD playback devices have a 27 MHz clock. It should be noted that audio-visual streams encoded using the AC3 standard, the MPEG 1 standard, and the MPEG 2 standard use a 27 MHz clock for synchronization.

Although DVD devices have been developed, they are typically stand-alone devices and have not been integrated with other systems. However, by integrating the functionality of a DVD device with a personal computer, additional functionality can be provided to a user. It is therefore desirable to integrate a DVD device into an existing system like a personal computer.

SUMMARY OF THE INVENTION

A DVD CD-ROM player is integrated with a personal computer. When integrating a DVD CD-ROM player with a personal computer, there are various problems that must be overcome. For example, the stream from the DVD CD-ROM utilizes a 27 MHz clock; however, a personal computer typically does not have a 27 MHz clock, but has a system clock that runs at the frequency of the processor (e.g., 133 MHz). Therefore, in order to play (or render) a DVD-based audio-visual work in a personal computer, a clock running at 27 MHz is needed. One solution to this problem may be to provide an additional clock through the use of hardware circuitry. However, this approach is expensive and time-consuming in terms of development time. Therefore, the DVD CD-ROM player utilizes a software-generated 27 MHz clock to facilitate rendering audio-visual streams in a personal computer. By providing a software clock emulation running at 27 MHz, synchronization of the audio-visual stream is facilitated and both cost and development time are reduced.

In accordance with a first aspect of the present invention, a method is provided in an audio-visual rendering device having a system clock with a first frequency. The audio-visual rendering device renders an audio-visual stream synchronized to a second frequency. The method provides a software clock that runs at the second frequency and receives a portion of the audio-visual stream having an associated play time. The method determines when to render the portion of the audio-visual stream by comparing a value of the software clock to the associated play time, and when it is determined to render the portion of the audio-visual stream, the method renders the portion of the audio-visual stream.

In accordance with a second aspect of the present invention, an audiovisual rendering device is provided. The audio-visual rendering device comprises a processor, a DVD drive, a video display, a speaker, and a memory. The processor has a system clock running at a first frequency. The DVD drive generates an audio-visual stream synchronized to a second frequency. The video display displays a video portion of the audio-visual stream. The speaker plays an audio portion of the audio-visual stream. The memory contains a software clock running at the second frequency and a program. The program receives the audio-visual stream from the DVD drive, examines the software clock to determine whether it is time to render a part of the audio-visual stream, and renders the part of the audio-visual stream when it is determined that it is time to render the part of the audio-visual stream.

BRIEF DESCRIPTION OF THE DRAWINGS

FIG. 1 depicts a computer system that is suitable for practicing a preferred embodiment of the present invention.

FIG. 2 depicts a format of the audio-visual stream received by the DVD player of FIG. 1.

DETAILED DESCRIPTION OF THE INVENTION

Figure 3A:
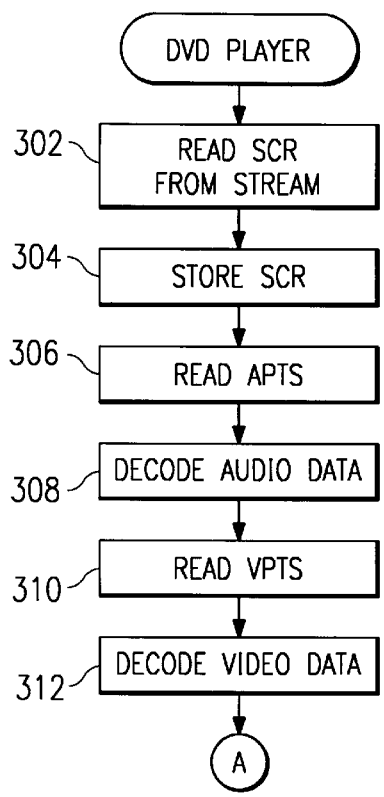
FIGS. 3A and 3B depict a flowchart of the steps performed by the DVD player depicted in FIG. 1.

Although it is desirable for a personal computer (PC) to be able to output audio-visual works from a DVD CD-ROM, various problems must be overcome to realize this goal. For example, the stream from the DVD CD-ROM utilizes a 27 MHz clock; however, a PC typically only has one clock, a system clock, that runs at the frequency of the processor (e.g., 133 MHz). Therefore, in order to play (or render) a DVD-based audio-visual work in a PC, a clock running at 27 MHz is needed. One solution to this problem may be to provide an additional clock through the use of hardware circuitry. However, this approach is expensive and time-consuming in terms of development time. Therefore, a preferred embodiment of the present invention provides a software-generated 27 MHz clock to facilitate rendering audio-visual streams from a DVD CD-ROM in a PC. By providing a software clock running at 27 MHz, synchronization of the audio-visual stream is facilitated and both cost and development time are reduced.

In order to provide a software clock running at 27 MHz, a preferred embodiment makes use of the time-stamp counter of the PENTIUM processor sold by Intel Corporation of Santa Clara, Calif. The time-stamp counter is a counter running at the frequency of the processor. The software clock of a preferred embodiment utilizes the time-stamp counter to keep time, but scales down the time-stamp counter so that the software clock runs at 27 MHz.

FIG. 1 depicts a computer system 100 that is suitable for practicing a preferred embodiment of the present invention. The computer system 100 contains a memory 102; a central processing unit (CPU) 104, such as the PENTIUM processor; a DVD CD-ROM ("DVD drive") 106; a video display subsystem 108, including a video controller 123 and a video display 125; a sound subsystem 110, including an audio controller 128 and a speaker 130; an audio decoder 112; a video decoder 114; a secondary storage device 116; and an input device 118. A DVD drive suitable for use in the computer system 100 is the DVD drive available from Panasonic Corporation of Secaucus, N.J. An example of a suitable video decoder is the STI 3520A video decoder, and an example of a suitable audio decoder is the STI 4600 audio decoder, where both are available from SGS-Thomson Microelectronics, Inc. of Dallas, Tex. The memory 102 contains an operating system 120, such as the MICROSOFT® WINDOWS® 95 operating system available from Microsoft Corporation of Redmond, Wash., and a DVD player program 122. The DVD player program 122 is responsible for reading an audio-visual stream from the DVD drive 106, decoding the audio-visual stream using the audio decoder 112 and the video decoder 114, and rendering both the audio portion of the audio-visual stream and the video portion of the audio-visual stream on the sound subsystem 110 and the video display subsystem 108, respectively, at the appropriate time and in synchronization. In determining the appropriate time to render the audio-visual stream, the DVD player 122 uses a software clock 124 which executes on a thread separate from the DVD player. Since the software clock 124 executes on a separate thread, it runs asynchronously with respect to the DVD player 122 and is scheduled for the CPU 104 separately from the DVD player. Instead of being implemented as a thread, one skilled in the art will appreciate that the software clock 124 could be implemented as a separate process or other software entity. The software clock 124 is a counter running at 27 MHz and is based on the time counter 126 of the CPU 104.

Both the audio decoder 112 and the video decoder 114 are implemented as hardware circuits using conventional techniques for decoding the audio or video data, like MPEG 1, MPEG 2, or AC3.

As previously stated, the DVD player 122 reads the audio-visual stream from the DVD drive 106 and renders the audio-visual stream using the video display subsystem 108 and the sound subsystem 110. The DVD player 122 operates as a driver under control of the operating system 120 and utilizes the operating system to access the DVD drive 106. As such, the DVD player 122 reads the audio-visual stream by requesting the operating system 120 to open a file on the DVD drive 106 that contains the audio-visual stream and by reading the stream from the DVD drive using normal file system calls of the operating system.

When receiving the audio-visual stream from the DVD drive 106 via the operating system 120, the stream has a format as depicted in FIG. 2. The audio-visual stream 200 comprises a number of frames 202, 204, 206, and 208. One skilled in the art will appreciate that a stream usually has many more frames. Each frame stores either audio data or video data and has a universal system clock reference (SCR) 210, which is a derivative of a 27 MHz time base. All rendering of video and audio data should be performed with respect to the universal system clock reference to ensure a proper performance of the audio-visual work, and prevent problems like lip synchronization problems from occurring. In addition to the SCR 210, each frame has a presentation time stamp (PTS), either an APTS for audio or a VPTS for video. This presentation time stamp (e.g., 212) contains a value that, when reached by a clock initialized to the SCR 210 and running at 27 MHz, indicates that the corresponding audio data (ADATA) or video data (VDATA) should be rendered.

Figure 3B:
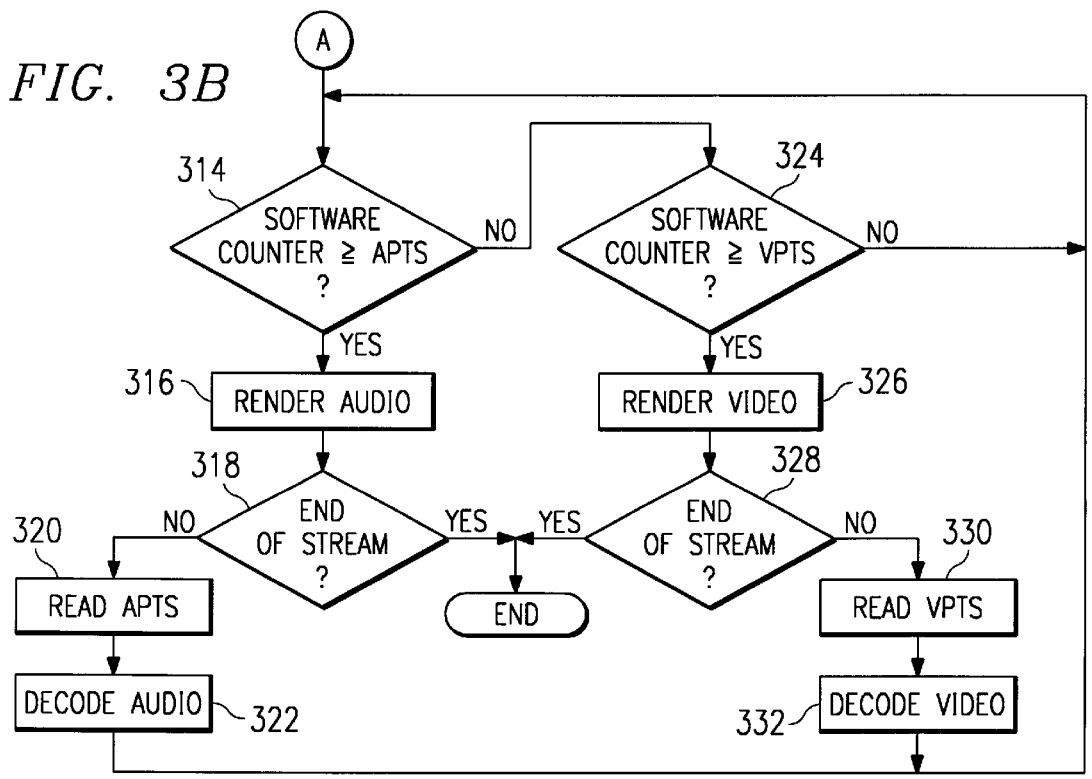

FIGS. 3A and 3B depict a flow chart of the steps performed by the DVD player 122. The first step performed by the DVD player is to read the first occurring SCR from the audio-visual stream (step 302). After reading the SCR from the stream, the DVD player stores the SCR into the time-stamp counter of the CPU and starts the software clock, which runs at 27 MHz (step 304). In this step, the DVD player starts a separate thread for executing the software clock using the well-known create thread system call of the WINDOWS® 95 operating system. After starting the system clock, all audio and video data is rendered with respect to the value of the software clock. Next, the DVD player reads a presentation time stamp (APTS) from the first audio frame encountered (step 306). After reading the APTS, the DVD player invokes the audio decoder 112 to decode the audio data corresponding to the APTS (step 308). The DVD player then reads the presentation time stamp (VPTS) from the first video frame encountered in the audio-visual stream (step 310) and invokes the video decoder 114 to decode the video data (step 312).

After decoding the video data, the DVD player accesses the software clock to determine if its value is greater than or equal to the APTS (step 314 in FIG. 3B). If the software clock, which is running at 27 MHz, has a value greater than or equal to the APTS, it is time for the DVD player to invoke the sound subsystem 110 to render the audio. Therefore, when the value of the software clock is greater than or equal to the APTS, the DVD player renders the audio (step 316). In this step, the DVD player passes the decoded audio data to the sound subsystem where the sound subsystem then plays the audio data on the speaker. After rendering the audio, the DVD player determines if the end of the audio-visual stream has been reached (step 318). If the end of the audio-visual stream has been reached, processing ends. Otherwise, the DVD player reads the APTS from the next-encountered audio frame (step 320) and invokes the audio decoder to decode the audio data (step 322). Processing then continues to step 314.

If in step 314 the value of the software clock is not greater than or equal to the APTS, the DVD player determines if the software clock's value is greater than or equal to the VPTS (step 324). If the software clock's value is not greater than or equal to the VPTS, processing continues to step 314. However, if the software clock's value is greater than or equal to the VPTS, the DVD player passes the decoded video data to the video subsystem to render the video (step 326). After rendering the video, the DVD player determines if the end of the audio-visual stream has been reached (step 328). If the end of the audio-visual stream has been reached, processing ends. If, however, the end of the audio-visual stream has not been reached, the DVD player reads the next encountered video frame to obtain a VPTS (step 330), decodes the corresponding video data (step 332), and proceeds to step 314.

The software clock running at 27 MHz plays an integral role in rendering the audio-visual stream. As previously stated, this software clock uses the time-stamp counter of the PENTIUM processor to keep time and scales the value of the time-stamp counter into a 27 MHz value used by the software clock. Thus, the time-stamp counter is used for initially storing the SCR and for updating the software clock, but the current value of the 27 MHz clock is kept in software. The software clock runs as a separate thread within the DVD player. As such, the software clock runs asynchronously with respect to the DVD player, is scheduled for execution by the CPU separately from the DVD player, and has its own context information and register values.

Figure 4:
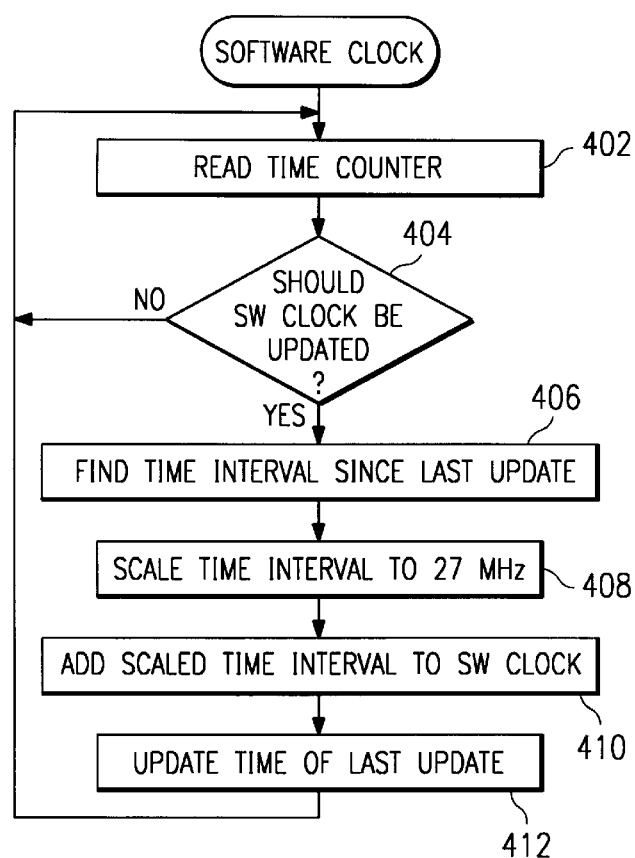
FIG. 4 depicts a flowchart of the steps performed by the software clock of the DVD player depicted in FIG. 1.

FIG. 4 depicts a flow chart of the steps performed by the software clock of a preferred embodiment of the present invention after its thread is created by the DVD player. The first step performed by the software clock is to read the current value of the time counter (step 402). In this step, the software clock must directly emit a specific opcode (0xF31) to the processor to obtain the time counter's current value, since available programming languages do not typically provide access to the time counter. Upon emitting the opcode to the processor, a 64-bit current time value is obtained where the low-order 32 bits are contained in the processor's EAX register and the high-order 32 bits are contained in the processor's EDX register. Code Table No. 1 contains exemplary code written in Microsoft Visual C++ version 4.0 that reads the current time from the time counter.

CODE TABLE NO. 1

```
// Global Variable
    unsigned int counthi, countlo:
    void
    read_htsc()
    {
        _asm
        {
            _emit 0x0f
            _emit 0x31
            mov     countlo,edx
            mov     counthi,edx
        }
        CurrentTime|=(counthi<<16);     // store counthi in upper 32 bits
```

CODE TABLE NO. 1-continued

```
        CurrentTime<<=16;
        CurrentTime&=0xffffffff;
        CurrentTime|=countlo;           // store countlo in lower 32 bits
    }
```

After reading the current time, the software clock determines whether the read time value should be updated (step 404). The software clock maintains a variable ("clock 27") which contains the current value of the software clock. In this step, the software clock determines whether the read time value should be updated by determining whether a sufficient number of clock ticks of the time counter, which runs at a faster frequency (e.g., 133 MHz), have occurred to warrant increasing the 27 MHz clock. For example, if the processor was running at 54 MHz, the 27 MHz clock would need to be updated one tick for every two ticks of the time counter.

If the software clock determines that the clock 27 variable does not need to be updated, processing continues to step 402. However, if the clock 27 variable does need to be updated, the software clock determines the amount of time relative to the time counter that has passed since the clock 27 variable was last updated (step 406) and scales this time interval to 27 MHz (step 408). This processing is described in greater detail below. Next, the software clock adds the scaled time interval to the clock 27 variable (step 410) and updates the indication of the last time that the clock 27 variable was updated (step 412). Pseudocode describing the processing of steps 404–412 is provided below in Code Table No. 2.

CODE TABLE NO. 2

```
// Global Variables
_int64  Target=27000000;        // 0x196ffc0 for 27MHz target freq
_int64  CPUFreq=133000000;      // 0x7ed6b40 for 133MHz Pentium
_int64  ScaleFactor;
_int64  Clock27=0;              // current 27MHz time
_int64  Clock27Time=0;          // last time clock 27 was updated
void Scale(void);
void Scale()
{
    ScaleFactor=CPUFreq/Target+(CPUFreq%Target>5);
                // Ex 4.925925925 . . . rounds up to 5
}
_int64
read_UPCNTR()
{
    read_htsc();            // update current time
    if (CurrentTime>(Clock27Time+ScaleFactor)) // update clock 27 when
                                               // necessary
    {
        Clock27+=(CurrentTime-Clock27Time)/ScaleFactor;
        Clock27Time=CurrentTime;
    }
    return Clock27;
}
```

After updating the time of last update of the clock 27 variable, processing continues at step 402. It should be appreciated that the software clock continues to execute until the DVD player terminates the thread.

Although the present invention has been described relative to a preferred embodiment thereof, those skilled in the art will appreciate that various changes in form and detail may be made without departing from the spirit and scope of the present invention as defined in the appended claims.

What is claimed is:

1. A method in an audio-visual rendering device having a built in microprocessor clock with a first frequency, the audio-visual rendering device for rendering an audio-visual stream synchronized to a second frequency, the method comprising the steps of:

reading a current time from the built in microprocessor clock;

scaling a software clock to the built in microprocessor clock so that the software clock runs at the second frequency, wherein the second frequency is different from the first frequency;

receiving a portion of the audio-visual stream having an associated play time;

determining when to render the portion of the audio-visual stream by comparing a value of the software clock to the associated play time; and when it is determined to render the portion of the audio-visual stream, rendering the portion of the audio-visual stream.

2. The method of claim 1 wherein the microprocessor clock is a counter and the software clock is a counter, and wherein the method further includes:

reading the microprocessor clock running at the first frequency;

determining when to increase the value of the software clock so that the software clock continues running at the second frequency; and when it is determined to increase the value of the software clock, increasing the value of the software clock so that the software clock continues to run at the second frequency.

3. The method of claim 1 wherein the portion of the audio-visual stream contains video data, wherein the step of receiving a portion includes receiving the portion wherein the portion is encoded using an MPEG compression standard, and wherein the step of rendering includes:

decoding the portion of the audio-visual stream; and displaying the portion on a video display.

4. The method of claim 1 wherein the portion of the audio-visual stream contains audio data, wherein the step of receiving a portion includes receiving the portion wherein the portion is encoded using an AC3 compression standard, and wherein the step of rendering includes:

decoding the portion of the audio-visual stream; and playing the portion on a speaker.

5. The method of claim 1 wherein the step of receiving a portion includes receiving the portion from a DVD CD-ROM.

6. A method in a computer system for rendering an audio-visual stream, the computer system having a hardware clock running at a first frequency, the method comprising the steps of:

reading an audio-visual stream in an encoded format from a DVD drive, the audio-visual stream having an audio portion with an audio play time and a video portion with a video play time, the audio portion and the video portion synchronized relative to a second frequency that is different than the first frequency;

decoding the audio portion of the audio-visual stream;

decoding the video portion of the audio-visual stream;

executing a software counter that runs at the second frequency;

determining whether it is time to render the decoded audio portion by comparing the audio play time to a value of the software counter;

when it is determined that it is time to render the decoded audio portion, rendering the decoded audio portion;

determining whether it is time to render the decoded video portion by comparing the video play time to the value of the software counter; and when it is determined that it is time to render the decoded video portion, rendering the decoded video portion.

7. The method of claim 6 wherein the software counter is periodically updated, the method further including:

reading the hardware clock to determine a current time;

determining a time difference between the current time and a last time that the software counter has been updated;

scaling the time difference to the second frequency to determine whether the software counter should be updated to continue running at the second frequency; and when it is determined that the software counter should be updated, increasing the software counter by the scaled time difference such that the software counter continues to run at the second frequency.

8. An audio-visual rendering device comprising:

a processor having a built-in clock running at a first frequency;

a DVD drive for generating an audio-visual stream synchronized to a second frequency;

a video display for displaying a video portion of the audio-visual stream;

a speaker for playing an audio portion of the audio-visual stream; and a memory containing:

a software clock running at the second frequency, the software clock generated from the built-in clock; and a program that reads the audio-visual stream from a memory location, the memory location neriodically updated with data from the DVD drive, that examines the software clock to determine whether it is time to render a part of the audio-visual stream, and that renders the part of the audio-visual stream when it is determined that it is time to render the part of the audio-visual stream.

9. The audio-visual rendering device of claim 8 wherein the part of the audio-visual stream has a time stamp and wherein the program determines when it is time to render the part by comparing the time stamp to a value of the software clock.

10. The audio-visual rendering device of claim 8 wherein the audio-visual rendering device is a personal computer.

11. The audio-visual rendering device of claim 8 wherein the audio portion of the audio-visual stream is encoded in accordance with an MPEG compression standard.

12. The audio-visual rendering device of claim 8 wherein the software clock executes on an asynchronous thread of the program.

13. The audio-visual rendering device of claim 8 wherein the video portion of the audio-visual stream is encoded in accordance with an MPEG compression standard.

14. The audio-visual rendering device of claim 13 wherein the audio-visual rendering device includes a decoder for decoding the video portion before being displayed on the video display.

15. The audio-visual rendering device of claim 8 wherein the audio portion of the audio-visual stream is encoded in accordance with an AC3 compression standard.

16. The audio-visual rendering device of claim 15 wherein the audio-visual rendering device includes a decoder for decoding the audio portion before being played by the speaker.

17. A computer-readable medium containing instructions for controlling an audio-visual rendering device having a hardware clock with a first frequency, the audio-visual rendering device for rendering an audio-visual stream synchronized to a second frequency, by performing the steps of:

provoding a software clock that runs at the second frequency, wherein the second frequency is different from the first frequency;

receiving a portion of the audio-visual stream having an associated play time;

determining when to render the portion of the audio-visual stream by comparing a value of the software clock to the associated play time; and when it is determined to render the portion of the audio-visual stream,
rendering the portion of the audio-visual stream.

18. The computer-readable medium of claim 17 wherein the step of determining when to render includes:

reading a current time from the hardware clock; and converting the current time to the second frequency.

19. The computer-readable medium of claim 17 wherein the hardware clock is a counter and the software clock is a counter, and further including:

reading the hardware clock running at the first frequency;

determining when to increase the value of the software clock so that the software clock continues running at the second frequency; and when it is determined to increase the value of the software clock,
increasing the value of the software clock so that the software clock continues to run at the second frequency.

20. A computer-readable medium containing instructions for controlling a computer system to render an audio-visual stream, the computer system having a hardware clock running at a first frequency, by performing the steps of:

reading an audio-visual stream in an encoded format from a DVD drive, the audio-visual stream having an audio portion with an audio play time and a video portion with a video play time, the audio portion and the video portion synchronized relative to a second frequency that is different than the first frequency;

decoding the audio portion of the audio-visual stream;

decoding the video portion of the audio-visual stream;

executing a software counter that runs at the second frequency;

determining whether it is time to render the decoded audio portion by comparing the audio play time to a value of the software counter;

when it is determined that it is time to render the decoded audio portion,
rendering the decoded audio portion;

determining whether it is time to render the decoded video portion by comparing the video play time to the value of the software counter; and when it is determined that it is time to render the decoded video portion,
rendering the decoded video portion.

21. The computer-readable medium of claim 20 wherein the software counter is periodically updated, and further including:

reading the hardware clock to determine a current time;

determining a time difference between the current time and a last time that the software counter has been updated;

scaling the time difference to the second frequency to determine whether the software counter should be updated to continue running at the second frequency; and when it is determined that the software counter should be updated,
increasing the software counter by the scaled time difference such that the software counter continues to run at the second frequency.

* * * * *